United States Patent
Duys et al.

(10) Patent No.: US 9,531,996 B1
(45) Date of Patent: Dec. 27, 2016

(54) METHOD AND DESIGN FOR OPTIMUM CAMERA AND DISPLAY ALIGNMENT OF CENTER OF THE ROOM VIDEO CONFERENCING SYSTEMS

(71) Applicant: Polycom, Inc., San Jose, CA (US)

(72) Inventors: Anthony Martin Duys, Merrimac, MA (US); Alain Nimri, Austin, TX (US); Stephen Schaefer, Cedar Park, TX (US); Shu Gao, Round Rock, TX (US); Glenn G. George, Austin, TX (US); Alvin Okunami, Round Rock, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/872,817

(22) Filed: Oct. 1, 2015

(51) Int. Cl.
  H04N 7/15    (2006.01)
  H04N 7/14    (2006.01)
  H04N 5/232   (2006.01)

(52) U.S. Cl.
  CPC .......... H04N 7/144 (2013.01); H04N 5/23238 (2013.01); H04N 7/15 (2013.01)

(58) Field of Classification Search
  USPC ....................................................... 348/14.08
  See application file for complete search history.

(56) References Cited

U.S. PATENT DOCUMENTS

| | | | |
|---|---|---|---|
| 5,801,919 A | 9/1998 | Griencewic | |
| 5,808,663 A | 9/1998 | Okaya | |
| 7,852,369 B2 | 12/2010 | Cutler | |
| 7,920,159 B2 | 4/2011 | Ueno | |
| 8,044,990 B2 | 10/2011 | Kawaguchi | |
| 2002/0018140 A1 | 2/2002 | Suemoto | |
| 2003/0122957 A1 | 7/2003 | Emme | |
| 2005/0024485 A1 | 2/2005 | Castles | |
| 2008/0151053 A1 | 6/2008 | Ishii | |
| 2008/0260131 A1 | 10/2008 | Akesson | |
| 2010/0118112 A1 | 5/2010 | Nimri | |
| 2014/0104244 A1* | 4/2014 | Baldwin | ............... G06F 1/1626 345/204 |

OTHER PUBLICATIONS

Milton Chen, "Leveraging the Asymmetric Sensitivity of Eye Contact for Videoconferencing", Proceedings of the CHI 2002 Conference on Human Factors in Computing Systems, pp. 49-56, Apr. 20-25, 2002.

* cited by examiner

*Primary Examiner* — Creighton Smith
(74) *Attorney, Agent, or Firm* — Blank Rome, LLP

(57) ABSTRACT

Systems for videoconferencing are designed for where people are seated around a video conferencing system. The systems include a camera so the far site can see the local participants and the systems include displays that show the far site. The displays are properly aligned with the cameras so that when people at the far site view the displayed images of the near site, it looks like they have eye contact with the near site. Obtaining the alignments of the camera and the displays to provide this apparent eye contact result requires meeting a series of different constraints relating to the various sizes and angles of the components and the locations of the participants.

17 Claims, 9 Drawing Sheets

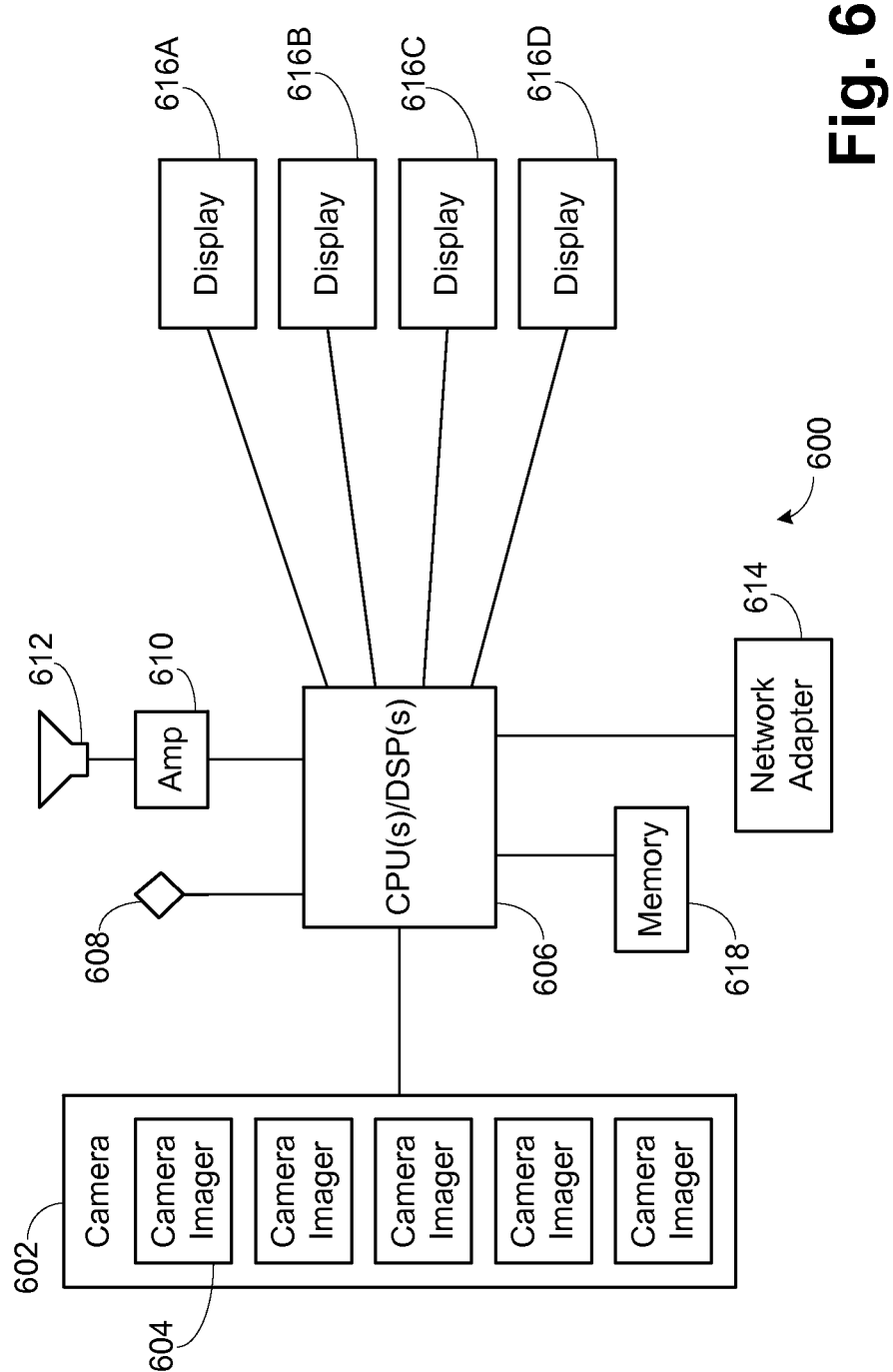

METHOD AND DESIGN FOR OPTIMUM CAMERA AND DISPLAY ALIGNMENT OF CENTER OF THE ROOM VIDEO CONFERENCING SYSTEMS

CROSS REFERENCE TO RELATED APPLICATIONS

This is related to U.S. patent application Ser. No. 29/539,282, entitled "VIDEOCONFERENCING UNIT," filed Sep. 11, 2015, which is hereby incorporated by reference.

BACKGROUND OF THE INVENTION

1. Field of the Invention

The present invention relates to videoconferencing units.

2. Description of the Related Art

Today's video conferencing systems do not allow for a conversation-like video conference where people are seated in a circle or around a system that is in the middle of the space or table. There are systems today that place a 360 degree camera in the center of a table and the far site is displayed on a wall at one end of the room. The participants are seated on three sides of the table and naturally face the wall display. This results in each participant facing the far site at a different angle, with most participants not facing the camera but instead having at least a portion of the side of their head being seen by the camera. Further, this portion varies with each participant so that it is clear that the participants are not looking at the camera but looking at the display on the wall. This results in a videoconference that is completely different from a normal conversation held in person, where the participants look at each other, and reduces the value of the videoconference.

There have been attempts to address this problem by the use of "presence" systems. However, most presence systems are very expensive and very difficult to set up properly and require significant bandwidth for their communications. This has limited the use of "presence" systems to only the most demanding environments.

SUMMARY OF THE INVENTION

According the embodiments of the present invention, systems for videoconferencing are designed where people are seated around a video conferencing system. The systems include a camera so the far site can see the local participants and the systems include displays that show the far site. The displays are properly aligned with the cameras and the local participants so that when people at the far site view the displayed images of the near site, it looks like they have eye contact with the near site. The reverse is also true if the far site has a similar system, so that both groups of participants can have a much more conversational videoconference without the expense and bandwidth of presence systems.

The embodiments allow for participants to sit in a circle or in a geometry where participants see each other around a space and they are all seen by the far site equally well. This is done by placing a surround camera in the center of the space along with the displays that show the far site. When the near site participants look at the far site on the displays, the near site camera provides a near eye-to-eye view to the far site since the camera is placed appropriately with the image of the far site.

Obtaining the alignments of the camera and the displays to provide this apparent eye contact result requires meeting a series of different constraints relating to the various sizes and angles of the components and the locations of the participants.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 6 is a block diagram of an exemplary videoconferencing unit according to the present invention.

DETAILED DESCRIPTION OF THE PREFERRED EMBODIMENTS

Embodiments according to the present invention allow for participants to sit in a circle or in a geometry where participants see each other around a space and they are all seen by the far site equally well. This is done by placing a surround camera in the center of the space along with the displays that show the far site. When participants look at the far site, the near site camera provides near eye-to-eye view to the far site since the camera is placed as close as possible to the image of the far site.

Figure 1:
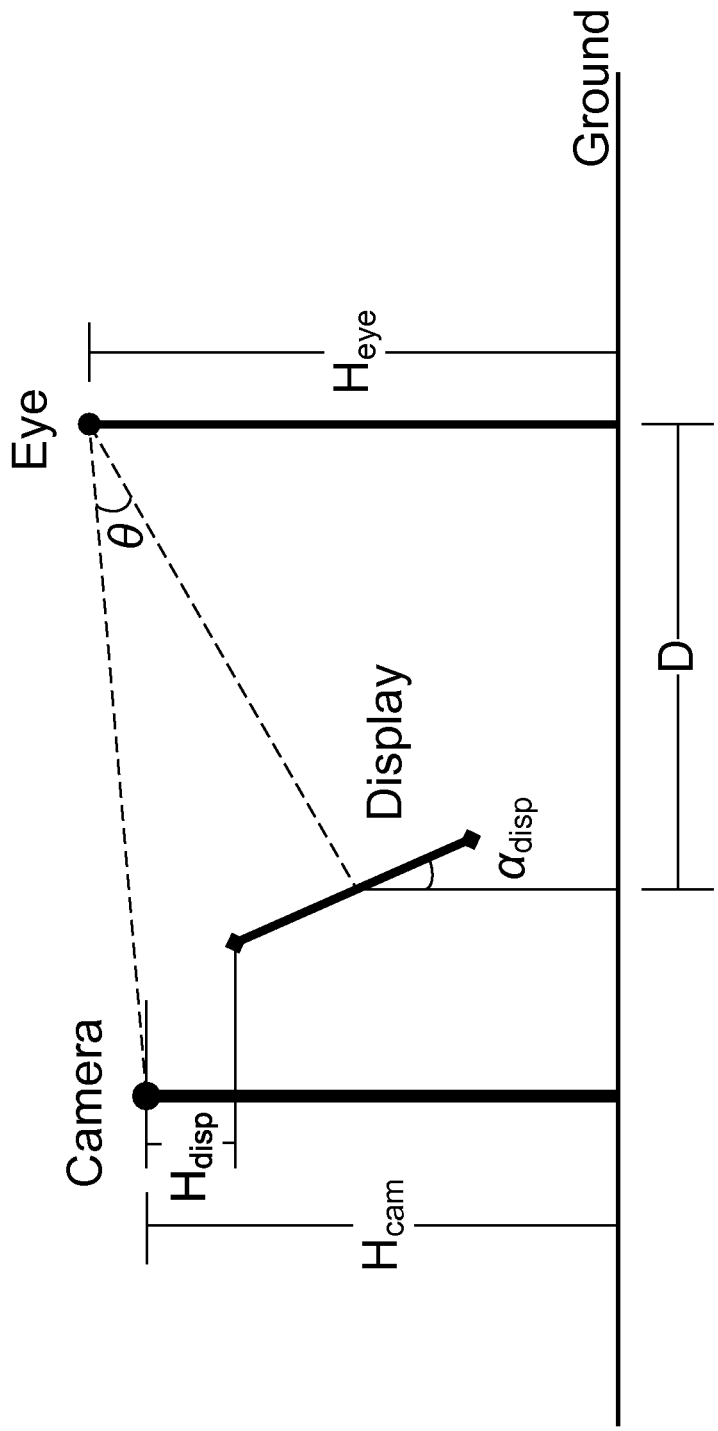
FIG. 1 is a diagram illustrating relationships of various variables relevant to developing an embodiment according to the present invention.
Figure 2:
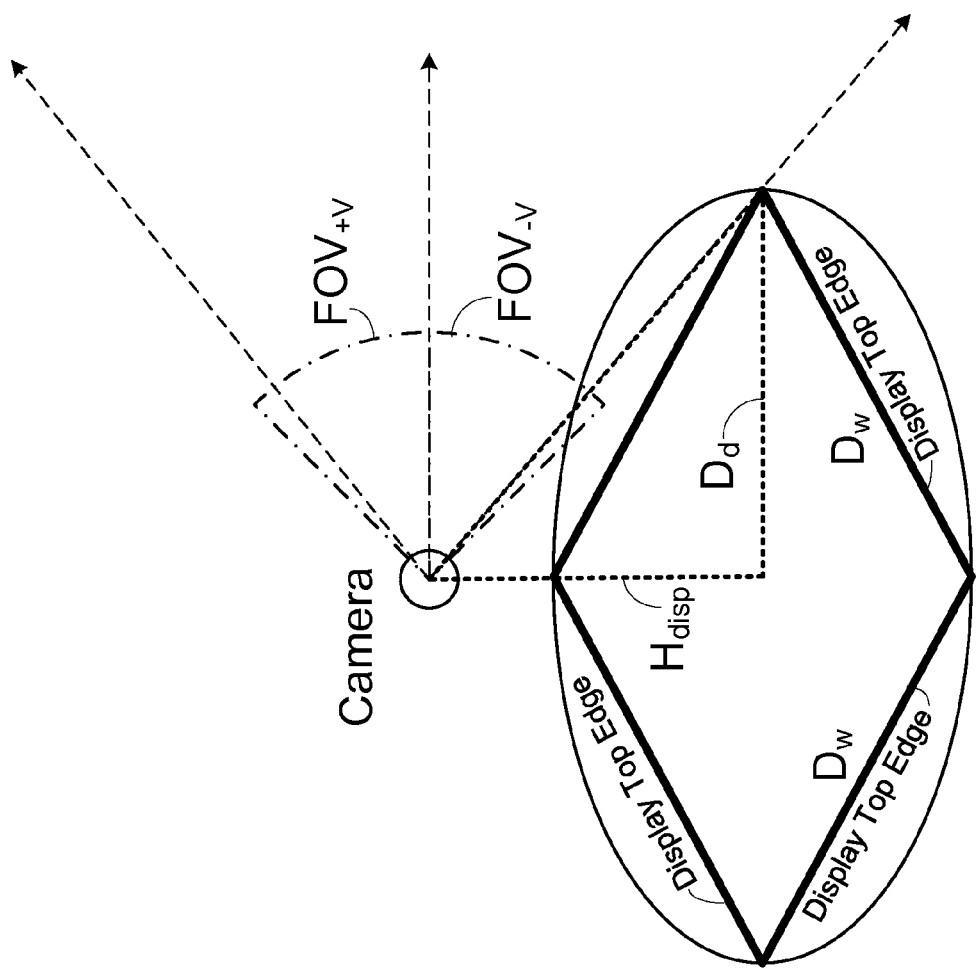
FIG. 2 is a diagram illustrating relationships of various variables relevant to developing an embodiment according to the present invention.

A number of variables are relevant to this description and many are shown graphically in FIGS. 1 and 2.:

Desired camera height for eye contact—$H_{cam}$

Display size width—$D_w$

Display size height—$D_h$

Vertical field of view (FOV) of the camera below horizontal axis—$FOV_{-v}$

Vertical field of view of the camera above horizontal axis—$FOV_{+v}$

Occlusion of the local participants from each other by the centrally located camera How far people sit from the camera Height of the 360° camera relative to top edge of the display so it does not see the top of the displays. —$H_{disp}$ For optimum eye contact with the far site, the camera needs to be positioned close to the display where the far site is shown.

Display angle from vertical, participant's eye is perpendicular to the display—$\alpha_{disp}$ The most important fact is the desired camera height $H_{cam}$. This can be derived by placing the camera at about an average eye level of an average person.

In practical embodiments, all of these factors come into play. With these factors in mind, it is then best to find the optimum camera height, display height and display tilt angle. Once these quantities are determined, the dimensions of an actual videoconferencing system can be determined. Because of the interrelationships, it is preferred to not allow a user to adjust these alignments so as to provide a "plug and play" experience.

With reference to FIGS. 1 and 2, it is then necessary to determine $H_{cam}$, $H_{disp}$, and $\alpha_{disp}$, based on display size, eye contact and user experience considerations, and sitting arrangements.

To simplify the problem, the following factors were selected to be "known quantities". These are factors either determined through experiment or left with limited variation or choices due to practical considerations.

Eye Level—$H_{eye}$

This is the eye level of an average person in a sitting position. This is derived through experiment and statistics. It is best to err on the lower end of the eye level distribution to ensure the vast majority of people will not see the camera as an obstruction to the view of the person sitting across the videoconferencing system.

Camera field of view—$FOV_{+v}$, $FOV_{-v}$

Generally a particular camera is chosen for other reasons, so that the FOV of the camera is fixed by the choice.

Display Dimension—$D_w$, $D_h$

Based on view angle, weight, cost, and other practical considerations, these factors usually limit the display choice to a few options, such as a display size of 27 inches or 23 inches (diagonal). An optimal set of ($H_{cam}$, $H_{disp}$, $\alpha_{disp}$) should best fit the selected display sizes. Note that the physical dimensions vary, even for a given diagonal size, from model to model due to bezel size variations.

Optimum Sitting Distance—D

This is how far from the display most people will sit. This is determined by target room size, view angle, social considerations (how close people can comfortably sit together), etc.

To solve the unknown quantities based on the known quantities, the following constrains are applied:

Constrain 1. The camera should be as close to eye level as possible (to maintain good eye contact), though if the camera FOV, is sufficiently large, the camera cab readily be below eye level.

$$H_{cam} \approx H_{eye} \quad \text{(Eq. 1)}$$

Constrain 2. Camera should be lower than eye level (to avoid obstruction of people by the camera). As mentioned with regard to Constrain 1, if the camera has a large $FOV_{+v}$, the camera can be lowered additional amounts as compared to cameras with less $FOV_{+v}$. This lower position is advantageous because it reduces the angle between the line of sight to the camera and line of sight to the center of the display as discussed in Constrain 3.

$$H_{cam} < H_{eye} \quad \text{(Eq. 2)}$$

Constrain 3. The angle between the line of sight to the camera and line of sight to the center of the display should be less than 20 degrees, with smaller angles such as 15°-16° or 10° being advantageous.

$$\theta < 20° \quad \text{(Eq.3)}$$

This constrain is to maintain a good eye contact. A study by Milton Chen, "Leveraging the Asymmetric Sensitivity of Eye Contact for Videoconferencing", Proceedings of the CHI 2002 Conference on Human Factors in Computing Systems, pp. 49-56, Apr. 20-25, 2002, which is hereby incorporated by reference, suggest that the angle separation between the camera and monitor should be less than 10 degrees before people start to notice eye contact issues. The inventors experience based on testing of units according to the present invention indicates that 20° is a more practical upper bound, with designs often employing angles in the 15°-16° range.

Constrain 4. The line of sight to the center of the display should be perpendicular to the display. If the display is purely vertical, this results in a less pleasing experience as the display is effectively canted with respect to the participant, which causes distortions in the displayed items.

$$\phi = 90° \quad \text{(Eq. 4)}$$

Constrain 5. The display's edge should not be seen by the camera.

As shown in the following diagram, this means the angle of the display's outer edge should be outside of the camera field of view as shown in FIG. 2.

$$\tan^{-1}\left(\frac{H_{disp}}{D_d}\right) > FOV_{-v} \quad \text{(Eq. 5)}$$

FIG. 2 illustrates a 4 display configuration. The top edges of the four displays are arranged end to end to form a square if looked down from above. $D_d$ in Eq. 4 is half of the diagonal length of that square.

$$D_d = \frac{\sqrt{2}}{2} D_w \quad \text{(Eq. 6)}$$

A similar equation could be derived if 3 or 5 monitors are used to form the center of the room displays.

Given the constrain equations Eq. 1-5, and taking proper approximations considering $$\frac{H_{eye} - H_{cam}}{H_{eye}} \ll 1,$$

$$\sin\alpha_{disp} \ll 1,$$

we can solve the unknown quantities as follows $$H_{cam} = H_{eye} \quad \text{(Eq. 6)}$$

$$H_{disp} > \frac{\sqrt{2}}{2} D_w \tan FOV_{-v} \quad \text{(Eq. 7)}$$

$$H_{disp} < \sin 20° \cdot D - \frac{D_h}{2} \quad \text{(Eq. 8)}$$

$$\alpha_{disp} = \sin^{-1}\left(\frac{H_{disp} + D_h/2}{D}\right) \quad \text{(Eq. 9)}$$

Eq. 6 basically says place the camera right below eye level. The most important factor is the height of camera relative to the top edge of the display, $H_{disp}$.

Eq. 7 gives the lower bound of $H_{disp}$ based on constrain 5 (edge of the display not in camera view).

Eq. 8 gives the upper bound of $H_{disp}$ based on constrain 3 (eye contact). Note that the larger $D_w$ and $D_h$ are, the narrower the range of acceptable $H_{disp}$ becomes. Therefore it is generally preferred to use a display with a thinner bezel to minimize $D_w$ and $D_h$ for the same viewing area.

Eq. 9 shows that the display tilt angle is a function of $H_{disp}$, $D_h$ and D. Once $H_{disp}$ is determined from the range given by Eq. 7-8, the tilt angle can be easily derived.

Figure 3:
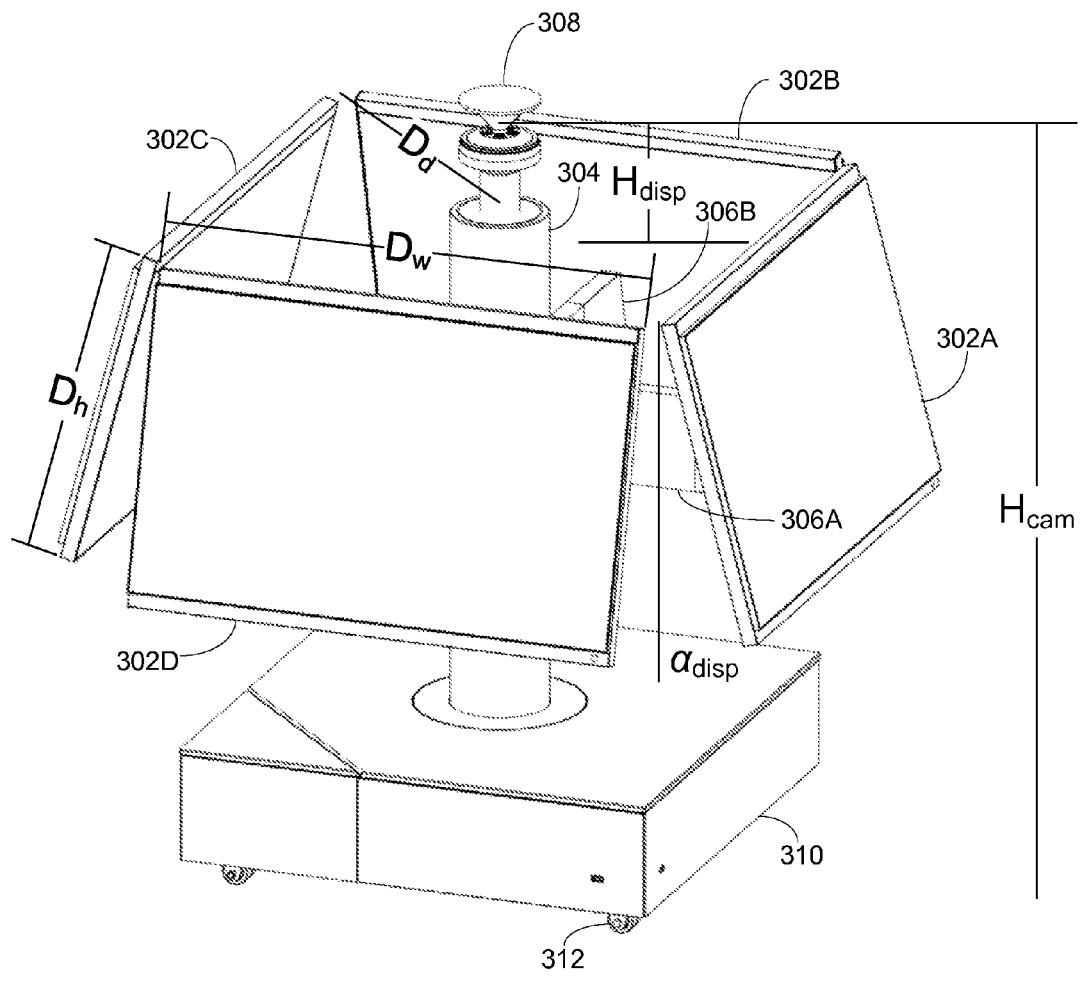
FIG. 3 is a perspective view of a first embodiment according to the present invention.

FIG. 3 illustrates an exemplary embodiment of a videoconferencing system 300 according to the present embodiment. Four displays 302A-D are located around a central column 304. Arms 306A-D (306C and 306D not shown) are provided to mount the displays 302A-D to the central column 304. The arms 306A-D are configured to place the displays 302A-D at the desired tilt or $\alpha_{disp}$. Each display 302A-D has a height of $D_h$ and a width of $D_w$. The optical center of the camera 308 is the distance $H_{disp}$ above the top edge of the displays 302A-D. The central column 304 is mounted to a base 310. The base 310 preferably includes the electronics of the videoconferencing system 300, such as shown in FIG. 6. This includes the electronics for the camera 308, to drive the displays 302A-D, to communicate with a far site and the like. The base 310 may be mounted on wheels or casters 312 for mobility.

As can be seen, the video displays 302A-D generally form the sides of an equilateral polyhedron. Four displays are shown but other numbers could be used if desired, with the video displays still generally forming the sides of an equilateral polyhedron. A 360° panoramic camera is preferred to allow full flexibility in the location of the participants, but in other embodiments the camera could just receive images from an axis aligned with the video displays. In the illustrated case the camera would then get four different images, one for each video display, to capture participants looking at the respective video display.

The central column 304 and arms 306A-D over a separate base 310 are preferred, but other configurations can be used. For example, a sheet metal chassis that is in the shape of the equilateral polyhedron could be used, the video displays mounted to the faces or sides of the chassis and the camera mounted to the top. The chassis could sit on a table or be floor standing, as desired. Numerous other structures could be used to hold the video displays and camera in the determined locations, as dictated by the aesthetics desired by the designers.

In a preferred embodiment of a floor mounted or standing videoconferencing system 300 the camera height is 1062 mm from the ground, the screen dimensions are 655 mm by 435 mm at a $\alpha_{disp}$ of 15°, with the $H_{disp}$ value being 225 mm and the participant seated 1800 mm away from the display with his eye at 1240 mm above the ground. With this embodiment the camera height from the ground can vary by 10 mm, from 1057 mm to 1067 mm and the user distance from the screen can vary from 450 mm to 2500 mm, with the eye height varying between 1140 mm and 1340 mm and still provide acceptable results.

Figure 4A:
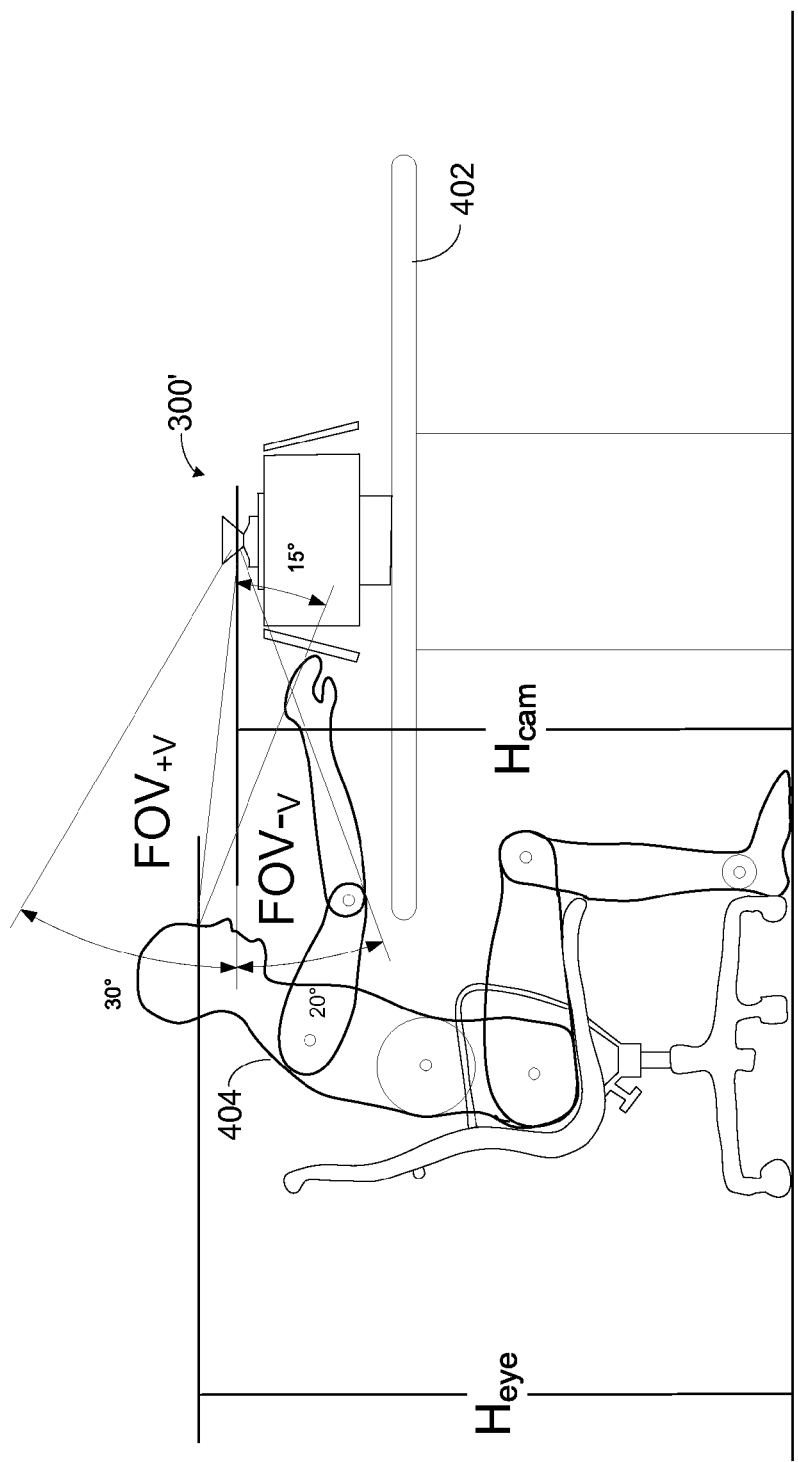
FIG. 4A is a side view of a second embodiment according to the present invention illustrating a location for the videoconferencing unit and a participant.

FIG. 4A illustrates a second embodiment where the videoconferencing unit 300' is reduced in size for table top 402 installation. In a preferred embodiment the camera height is 1142 mm, the screen dimensions are 350 mm by 200 mm at a $\alpha_{disp}$ of 15°, with the $H_{disp}$ value being 80 mm and the participant 404 seated 780 mm away from the display with his eye at 1240 mm. With this embodiment the camera height from the ground can vary by 50 mm, from 1090 mm to 1190 mm and the user distance from the screen can vary from 560 mm to 700 mm, with the eye height varying between 1140 mm and 1340 mm and still provide acceptable results.

Figure 4B:
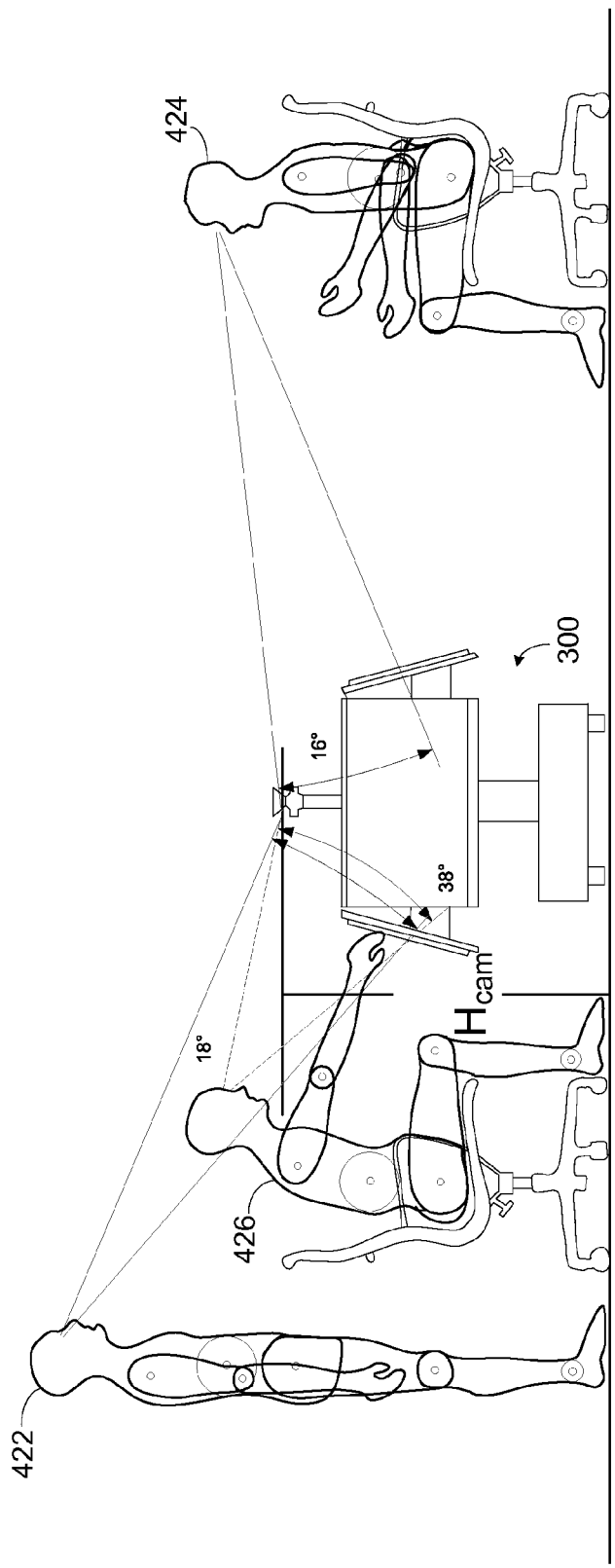
FIG. 4B is a side view of the first embodiment according to the present invention illustrating various locations of participants with respect to the videoconferencing unit.

FIG. 4B is an illustration of the floor standing videoconferencing system 300 with three different participant positions. In a standing position 422 the participant's eye is 1690 mm from the camera and 1725 mm above the ground. This results in a $\theta$ angle of approximately 18°, an acceptable angle so that the participant appears to have eye contact with the far site. In a seated position 424 the participant's eye is 1830 mm from the camera and 1240 mm above the ground, resulting in a $\theta$ angle of approximately 16°, a very acceptable angle so that the participant appears to have eye contact with the far site. In a seated position 426 the participant is seated much closer to the videoconferencing system 300, the eye 900 mm from the camera and 1205 mm above the ground. This position 426 results in a $\theta$ angle of approximately 38°, well above the point where the participant no longer appears to have eye contact with the far site. The participant needs to move from position 426 to a position farther from the videoconferencing unit 300, such as position 424, where the participant appears to have eye contact with the far site.

Figure 5A:
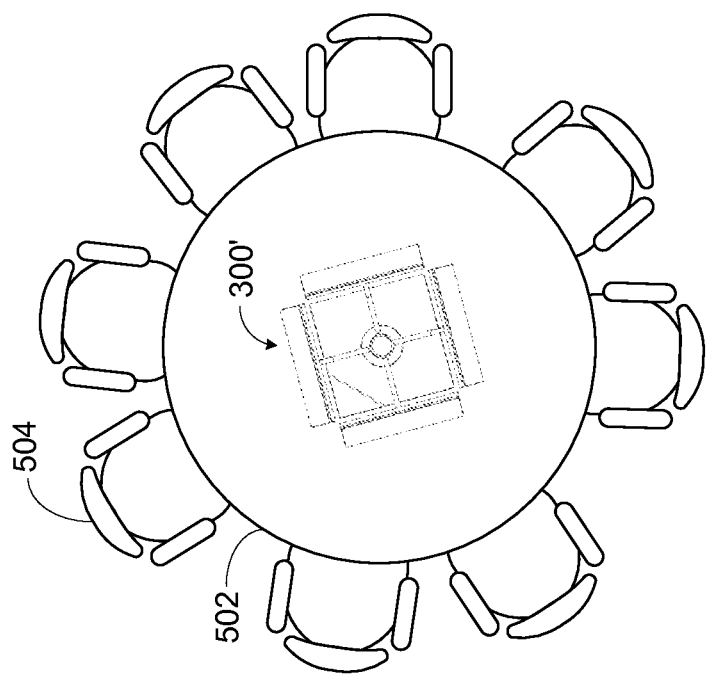
FIG. 5A is a top view of the second embodiment according to the present invention illustrating a central location for the videoconferencing unit on an office table surrounded by chairs.

FIG. 5A is top view of a table top videoconferencing unit 300' on a typical meeting room table 502 surrounded by chairs 504. The dimensions of the illustrated table 502 is 1800 mm or 6 feet in diameter so that the chairs 504 are at approximately the preferred 780 mm from the display. A 5 foot diameter table can be used, though the participants are a little closer so that the $\theta$ angle is approaching the 20° limit.

Figure 5B:
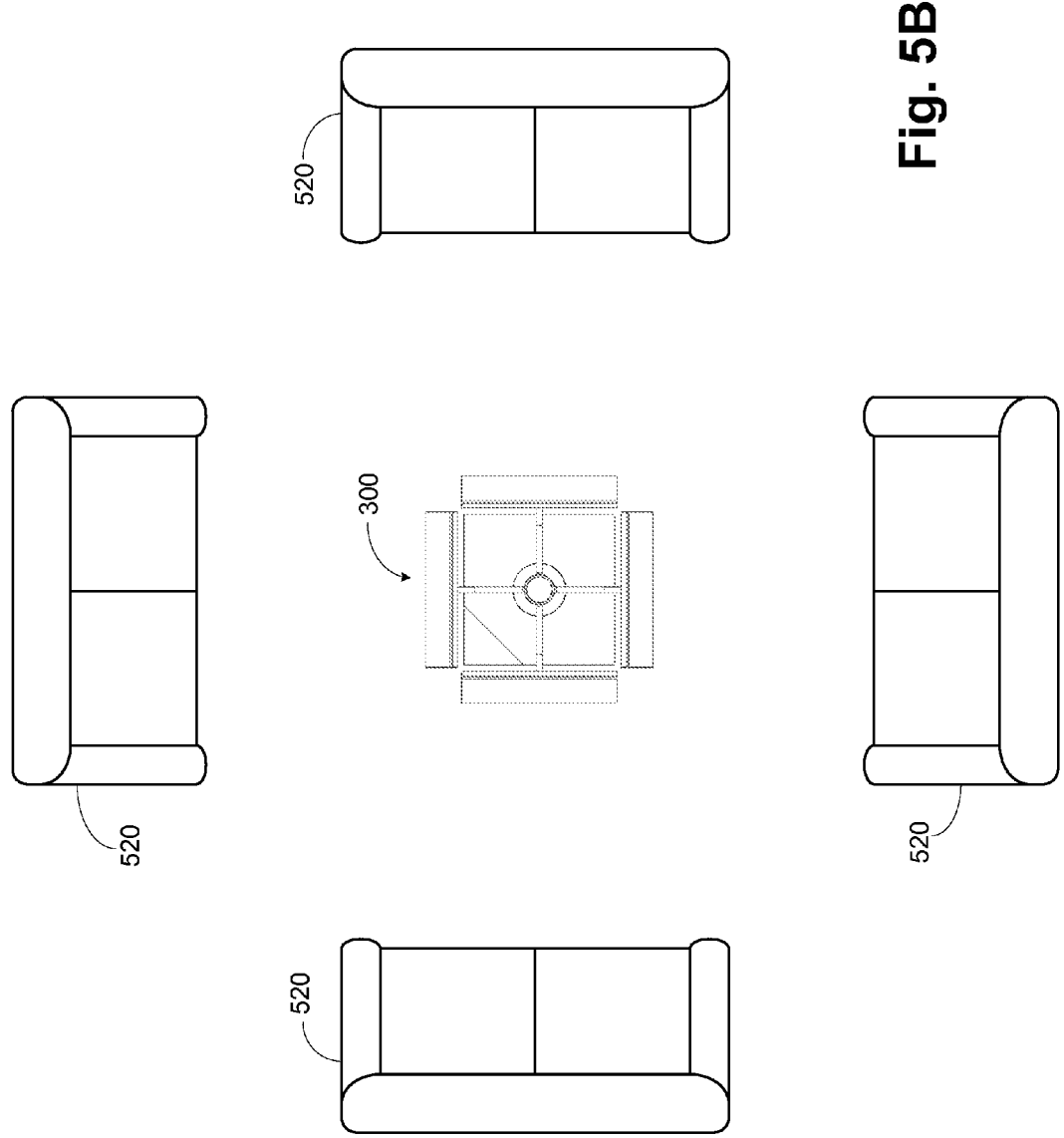
FIG. 5B is a top view of the first embodiment according to the present invention illustrating a central location for videoconferencing unit in a setting with love seats.

FIG. 5B is a top view of a room containing the floor standing videoconferencing unit 300 surrounded by four normal sized love seats 520, the love seats 520 placed so that the participants are approximately the desired 1800 mm from the display. In testing systems according to the present invention, it has been found that a floor standing videoconferencing unit 300 having the preferred dimensions provided above can work satisfactorily in room sizes from 11 feet square to 30 feet square, with the seating adjusted according to the room size, not merely to optimize eye contact.

FIG. 6 is a block diagram of an exemplary videoconferencing unit 600. A camera 602 is formed by a series of camera imagers 604. In the illustrated embodiment five imagers 604 are shown to allow for a full 360° panoramic image to be developed. Different numbers of imagers can be used in either a panoramic camera or a camera having views only over the video displays. The camera 602 is connected to a CPU/DSP complex 606. The included CPUs and DSPs provide the processing components to form the panoramic image from the images, encode the image and any audio for transmission using industry standard formats, decode any received image for display, encode any local audio and decode any audio from the far site. A memory 618 holds the necessary software programs and working memory needed for the CPUs and DSPs. A microphone 608 is used to receive the local speech signals. A simple microphone is shown for explanatory purposes, it being understood that many different microphone arrangements could be used, such as liner arrays, circular arrays and the like. An amplifier 610 receives the analog audio output developed by encoding the far site audio and drives a speaker 612 so that participants can hear the audio of the far site. A network adapter 614 is connected to the CPU/DSP complex 606 to provide the interface to connect to a far site videoconferencing unit. Typically the network adapter 614 is an Ethernet adapter configured to use a TCP/IP connection but other types can be used as is well known. The CPU/DSP complex 606 is connected to video displays 616A-D to provide the images from the far site. In preferred embodiments the video displays 616A-D are touch screens to allow easier participant control, though it is noted that when a participant is actually using the touch screen, the participant may be too close to the video display to allow eye contact at the far site. When the participant returns to a normal position after completing operations on the touch screen, the participant will have returned to a position providing eye contact. The images can be presented in various formats. For example, each video display 616A-D could show a panoramic strip and a single large window for the current speaker. Alternatively, each video display 616A-D could show a composite of the four images directly in front of the far site video displays, if a similar videoconferencing unit is present at the far site. Other arrangements and formats can be done if desired and are familiar to those skilled in the art.

Figure 7:
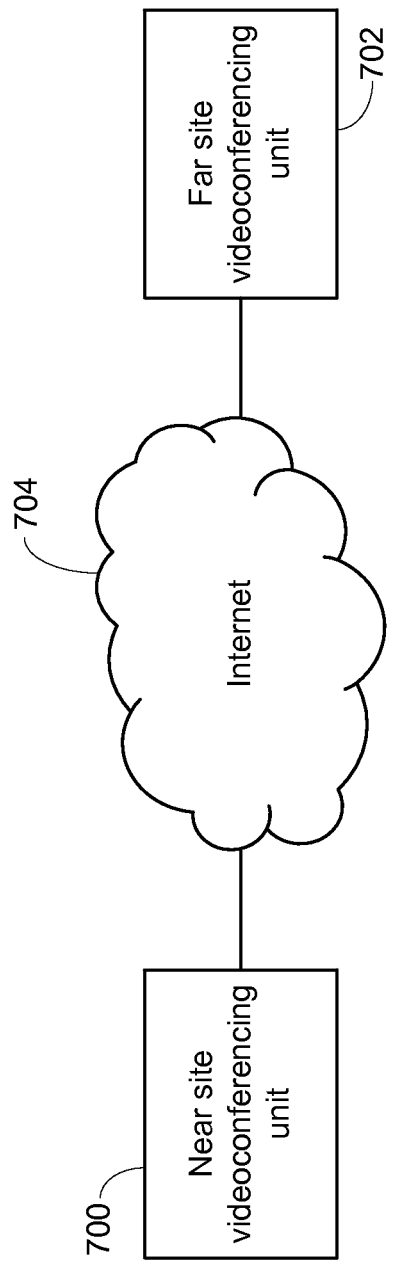
FIG. 7 is a block diagram of interconnected videoconferencing units.

FIG. 7 illustrates the connection of two videoconferencing units 700 and 702 through the Internet 704. It is understood that the Internet is an exemplary network and other private and public networks, or a combination thereof, can be used to connect the videoconferencing units 700 and 702. Typical industry standard formats such as H.263, H.264 and H.265 can be used for the video codecs, with signaling done using H.323 or SIP. Normal audio codecs such as G.729, G.711 and the like can be used as the audio codecs. One skilled in the art will be familiar with the various audio and video codecs and signaling industry standards used for videoconferencing, as well as various proprietary formats.

With this it is shown that both table top and floor standing videoconference units can be developed that provide eye contact to the far site by following the described procedures.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A near site videoconferencing unit for use with a far site videoconferencing unit, the near site videoconferencing unit comprising:
    a plurality of rectangular video displays having a predetermined height and width arranged generally vertically and generally forming the sides of an equilateral polyhedron, each video display having a predetermined angle from vertical, the plurality of video displays for displaying video provided from the far site videoconferencing unit;
    a camera receiving images from at least a plurality of views equal to the plurality of video displays, the camera for providing video images of the near site to the far site videoconferencing unit; and
    a central structure to which the plurality of video displays are mounted to fix the individual video displays at the predetermined angle from vertical and in the generally equilateral polyhedron configuration and to which the camera is mounted so that the camera is mounted above the plurality of video displays, the central structure having a relationship to a floor of a room so that the camera is a predetermined distance from the floor,
    wherein the relationship between the height of the camera and the height, width and angle from vertical of the plurality of video displays is such that a participant whose eyes are within a predetermined distance from the camera and a predetermined distance from the floor is perceived by participants at the far site as making eye contact; and
    wherein the predetermined distance from the camera, the predetermined distance from the floor, the height of the camera and the height and angle from vertical of the plurality of video displays are such that the angle between the camera and the center of an individual video display with reference to the participant's eyes is less than 10 degrees.

2. The near site videoconferencing system of claim 1, wherein the near end videoconferencing unit is configured to be located on the floor and the predetermined distance of the participant's eyes from the floor is a distance attained in a seated position.

3. The near site videoconferencing system of claim 1, wherein the near end videoconferencing unit is configured to be located on a table, which is in turn located on the floor, the predetermined distance of the participant's eyes from the floor is a distance attained in a seated position and the predetermined distance of the participant's eyes from the camera is attained when the participant is seated at the table.

4. The near site videoconferencing system of claim 1, further comprising:
    an electronics module coupled to the plurality of video displays and the camera and for connection to the far site videoconferencing unit, the electronics module converting the images from the camera into a videoconferencing format signal for transmission to the far site videoconferencing unit and converting a received videoconferencing format signal from the far site videoconferencing unit for display by the plurality of video displays.

5. The near site videoconferencing system of claim 1, wherein the camera is a 360 degree panoramic camera.

6. The near site videoconferencing system of claim 1, wherein the predetermined distance from the camera and the predetermined distance from the floor of the participant's eyes are each ranges of distances and distance values within each range allow the far site participants to perceive the near site participant as making eye contact.

7. A near site videoconferencing unit for use with a far site videoconferencing unit, the near site videoconferencing unit comprising:
    at least one video display having a predetermined height and width arranged vertically, the video display having a predetermined angle from vertical, the video display configured to display video provided from the far site videoconferencing unit;
    a camera, capable of receiving images from a plurality of views, the camera adapted to provide video images of the near site to the far site videoconferencing unit; and
    a central structure to which the video display is mounted and to which the camera is mounted, the central structure having a relationship to a floor so that the camera is a predetermined distance from the floor,
    wherein the relationship between the height of the camera and the height, width and angle from vertical of the video display is such that at least one participant whose eyes are within a predetermined distance from the camera and a predetermined distance from the floor are capable of being perceived by at least one participant at the far site as making eye contact; and
    wherein the predetermined distance from the camera, the predetermined distance from the floor, the height of the camera and the height and angle from vertical of the video display are such that the angle between the camera and the center of the video display with reference to at least one participant's eyes is less than 20 degrees.

8. The near site videoconferencing system of claim 7, wherein the predetermined distance from the camera, the predetermined distance from the floor, the height of the camera and the height and angle from vertical of the video display are such that the angle between the camera and the center of the video display with reference to at least one participant's eyes is between 15 and 18 degrees.

9. The near site videoconferencing system of claim 7, wherein the predetermined distance from the camera, the predetermined distance from the floor, the height of the camera and the height and angle from vertical of the video display are such that the angle between the camera and the center of the video display with reference to at least one participant's eyes is less than 10 degrees.

10. The near site videoconferencing system of claim 7, wherein the near end videoconferencing unit is configured to be located on the floor.

11. The near site videoconferencing system of claim 7, wherein the near end videoconferencing unit is configured to be located on a table, which is in turn located on the floor.

12. The near site videoconferencing system of claim 7, wherein said angle from vertical is greater than zero degrees.

13. The near site videoconferencing system of claim 7, further comprising:
   an electronics module coupled to the video display and the camera and adapted to connect to the far site videoconferencing unit, the electronics module capable of converting images from the camera into a videoconferencing format signal for transmission to the far site videoconferencing unit and configured to convert a received videoconferencing format signal from the far site videoconferencing unit for display by the video display.

14. The near site videoconferencing system of claim 7, wherein the predetermined distance from the camera and the predetermined distance from the floor of at least one participant's eyes are each ranges of distances and distance values within each range allow at least one far site participant to perceive at least one near site participant as making eye contact.

15. A method for creating the sensation of eye contact between at least two participants in a videoconference, one participant located at a near site and the other participant located at a far site, the method comprising:
   providing at least one video display having a predetermined height, width, and angle from vertical, a camera, and a central structure; and
   arranging the at least one video display and the camera such that the relationship between the height of the camera and the height, width and angle from vertical of the video display is such that at least one participant whose eyes are within a predetermined distance from the camera and a predetermined distance from the floor are capable of being perceived by at least one participant at the far site as making eye contact
   wherein the predetermined distance from the camera, the predetermined distance from the floor, the height of the camera and the height and angle from vertical of the video display are such that the angle between the camera and the center of the video display with reference to at least one participant's eyes is less than 20 degrees.

16. The method of claim 15, wherein the predetermined distance from the camera, the predetermined distance from the floor, the height of the camera and the height and angle from vertical of the video display are such that the angle between the camera and the center of the video display with reference to at least one participant's eyes is between 15 and 18 degrees.

17. The method of claim 15, wherein the predetermined distance from the camera, the predetermined distance from the floor, the height of the camera and the height and angle from vertical of the video display are such that the angle between the camera and the center of the video display with reference to at least one participant's eyes is less than 10 degrees.

* * * * *